(12) United States Patent
Meier

(10) Patent No.: US 6,538,811 B2
(45) Date of Patent: Mar. 25, 2003

(54) LIGHT INTENSIFYING DEVICE

(76) Inventor: Herbert Franklin Meier, 312 W. 7$^{th}$, Stuttgart, AR (US) 72160

( * ) Notice: Subject to any disclaimer, the term of this patent is extended or adjusted under 35 U.S.C. 154(b) by 0 days.

(21) Appl. No.: 09/783,055

(22) Filed: Feb. 15, 2001

(65) Prior Publication Data

US 2002/0109914 A1 Aug. 15, 2002

(51) Int. Cl.$^7$ .............................. G02B 23/00; F41G 1/38
(52) U.S. Cl. ........................ 359/399; 359/350; 359/362; 42/103; 33/245
(58) Field of Search ................... 359/511, 600, 359/611, 350–361, 399, 402, 404–407, 409–410, 808–810, 819, 827; 250/214 VT; 42/101, 103; 33/233, 241

(56) References Cited

U.S. PATENT DOCUMENTS

| 3,315,362 | A | * | 4/1967 | Palmer |
| 4,835,621 | A | * | 5/1989 | Black |
| 5,225,932 | A | * | 7/1993 | Wannagot et al. |
| 5,444,507 | A | * | 8/1995 | Palmer |
| 5,937,562 | A | | 8/1999 | Brough ........................ 42/103 |
| 6,131,294 | A | * | 10/2000 | Jibiki |

* cited by examiner

*Primary Examiner*—Thong Nguyen
(74) *Attorney, Agent, or Firm*—Baker, Donelson, Bearman & Caldwell

(57) ABSTRACT

An optical device (10) is disclosed which is mountable to a scope (S) having an objective lens OL and an eyepiece EP. The optical device (10) has a light intensifying module (11), an eyepiece (12), an objective lens unit (14), and an elastic, tubular collar (21). The collar (21) has a first end (22) adapted to be stretchably coupled with the scope eyepiece and second end (23) adapted to be stretchably coupled to the optical device objective lens unit (14) to provide air tight seals.

10 Claims, 1 Drawing Sheet

LIGHT INTENSIFYING DEVICE

TECHNICAL FIELD

The present invention relates to optical devices, and specifically to light intensifying devices adapted to be coupled to a scope.

BACKGROUND OF THE INVENTION

Light intensifying devices, commonly referred to as night vision equipment, have existed for many years. Typically, these devices have an objective lens through which light is received, a light intensifying module which amplifies the received light, and an eyepiece through which the amplified image is viewed.

Some optical devices have been combined with light intensifying modules to enable the optical device to be utilized in low light conditions. U.S. Pat. No. 4,822,994 discloses a fire arm scope which is adapted to be utilized with a light intensifying device. Here, the scope during normal daylight use has a first section with an objective lens and a second section with an eyepiece. The two sections are coupled together with the use of a flange. In low light conditions, the two sections are separated and an image intensifying module is coupled between the two sections. This procedure however is complex and time consuming. Moreover, the first and second sections and the light intensifying module are all designed to be compatible for use only with each other.

Optical devices have also been designed with interchangeable eyepieces. These devices typically include an eyepiece adapted for use in daylight which may be removed and replaced with a nighttime eyepiece including a light intensifying module. The conversion of the device from daylight to nighttime use is time consuming because the daytime eyepiece must be removed and stowed prior to the mounting of the nighttime eyepiece. The same problem also presents itself when the optical device is converted from nighttime use to daytime use. Furthermore, the light intensifier must be used in conjunction with the other components and may not be utilized alone as a light intensifying device.

Another problem associated with multiple component or interchangeable component devices has been the corruption of sealed components. Optical devices typically include sealed chambers between the objective lens and the eyepiece. These chambers are filled with a gas to prevent moisture from condensing upon the lens of the device. However, should the components be separated these internal components become exposed to ambient conditions wherein moisture may enter the device and thereby cause problems with the reliability and operation of the device.

Light intensifying devices have also been designed to be mounted to existing optical devices. These light intensifying devices typically include mechanical clamping systems which encompass the eyepiece of the optical device. These clamping devices however often provide an uneven force upon the eyepiece which causes damage. Furthermore, these clamping devices are typically split rings the ends of which are brought together in clamping the device to the eyepiece. These split ring clamping devices do not provide an air tight seal between the light intensifying device and the optical device, the lack of which allows moisture to enter the space between these devices even when they are mounted together.

Accordingly, it is seen that a need remains a device that is easily and quickly coupled to an existing optical instrument to convert it to nighttime use without compromising the integrity of the optical instrument. It is to the provision of such therefore that the present invention is primarily directed.

SUMMARY OF THE INVENTION

In a preferred form of the invention, an image intensifying device is disclosed which is adapted to be mounted to a scope having an objective lens and an eyepiece of a select outside diameter. The image intensifying device comprises an image intensifying module, an eyepiece coupled to the image intensifying module which includes an eyepiece lens, and an objective lens unit coupled to the image intensifying module opposite the image intensifying device eyepiece. The objective lens unit has an objective lens and a housing containing the objective lens. The housing has a tubular, elastic collar having a distal end with an inside diameter less than the outside diameter of the scope eyepiece. With this construction, the image intensifying device is mounted to the scope by stretching the elastic collar distal end about the scope eyepiece with the objective lens unit substantially aligned with the scope eyepiece.

DETAILED DESCRIPTION

Figure 1:
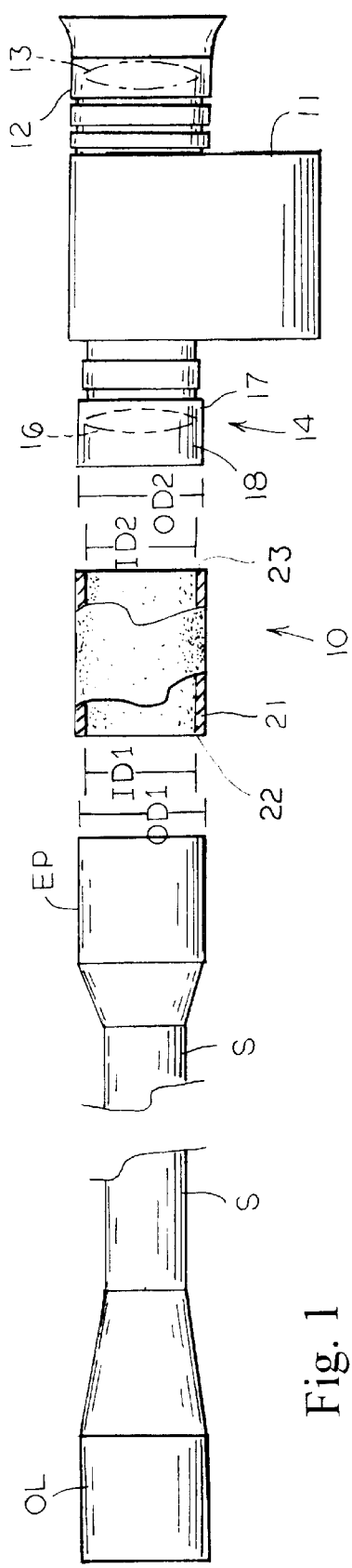
FIG. 1 is an exploded side view of a rifle scope and optical device in a preferred form of the invention.

With reference next to the drawings there is shown an optical device 10 in a preferred form of the invention shown mounted to a scope S of the type which is affixed to a rifle. The scope S includes an objective lens OL and an eyepiece EP having a select outside diameter OD1.

The optical device 10 has a light intensifying module 11, an eyepiece 12 with an eyepiece lens 13 therein, and an objective lens unit 14 opposite the eyepiece 12, the basic form of this type of night vision monocular is sold by ITT Industries as the Night Quest 190. The objective lens unit 14 includes an objective lens 16 mounted within an annular lens housing 17. The housing 17 includes a rotatable focusing ring 18 having an outside diameter OD2. The optical device 10 also includes a tubular collar 21, preferably made of a resilient rubber, having a tubular, elastic first end 22 and a tubular, elastic second end 23. The collar first end 22 has an inside diameter ID1 which is slightly smaller than the outside diameter OD1 of the scope eyepiece EP. The collar second end 23 has an inside diameter ID2 which is slightly smaller than the outside diameter OD2 of the focusing ring 18.

In use, the collar first end 22 is stretched over the eyepiece EP of the scope S, i.e. the eyepiece is press fitted into the collar first end 22, so as to be mounted tightly about the eyepiece EP. The collar second end 23 is then stretched over the objective lens unit 14 of the light intensifying module 11, i.e. the objective lens unit 14 is press fitted into the second end 23, so as to be mounted tightly about the focusing ring 18 of the objective lens unit 14. With the scope S and optical device 10 mounted with the collar 21 in this manner and with the structural rigidity of the collar supporting the weight of the light intensifying module 11, eyepiece 12 and objective lens unit 14, the optical device 10 is maintained aligned along the focal line of the scope S. As such, the scope S is aligned with the optical device 10 so that light entering the objective lens OL of the scope passes through the scope, exits the scope eyepiece EP, enters the optical device objective lens 16, passes through the light intensifying module 11, and exits the optical device eyepiece lens 13. Thus, images are magnified by the scope S and the light therefrom amplified by the optical device 10 so that the image may be viewed in very low light conditions.

As the collar 21 is coupled directly to the focusing ring 18 of the objective lens unit 14 the user may adjust the focusing of the combined scope and optical device through a change in the distance between the scope objective lens OL and the optical device eyepiece lens 13. This is accomplished by simply rotating the light intensifying module 11, thereby causing relative rotation between light intensifying module 11 and the objective lens focusing ring 18. This relative rotation of the light intensifying module causes the eyepiece lens 13 to move towards and away from the scope objective lens OL as needed to bring the subject matter within the scope's field of view into focus.

It should be understood that the elastic nature of the collar allows the scope to be easily and quickly removed from the collar 21 so that the scope may be utilized without the optical device 10. Similarly, the optical device 10 may be easily and quickly removed from the collar 21 to allow the optical device 10 to be utilized without the use of the scope S. This ability to quickly separate the scope S from the optical device 10 allows greater flexibility to hunters and the like which may require both combined usage and separate usage of these components within a very short time period. Once removed the scope S or optical device 10 may be easily reinserted into the collar 21 for use in combination with the other component.

Furthermore, it should be understood that the resilient nature of the collar 21 provides an airtight seal between the collar 21 and both the scope eyepiece EP and the optical device lens unit 14. As such, moisture is restricted from occupying the space between the scope eyepiece EP and the optical device lens unit 14 which may prevent fogging of the respective lens and the resulting degradation of the viewed image, a problem long associated with devices of the prior art. It should also be understood that as an alternative the collar 21 may be an integral part or extension of the objective lens housing 17. It should also be understood that the just described invention may be utilized with any type of optical device such as telescopes, binoculars, other gun scopes, video cameras, and the like.

Figure 2:
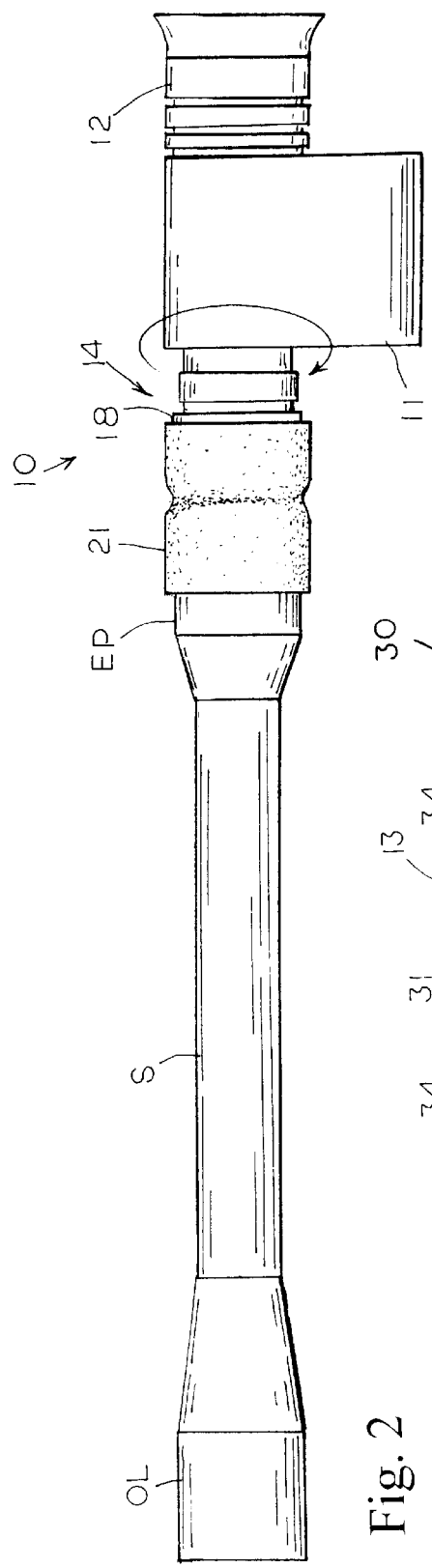
FIG. 2 is a side view, shown in partial cross-section, of the rifle scope and optical device of FIG. 1.
Figure 3:
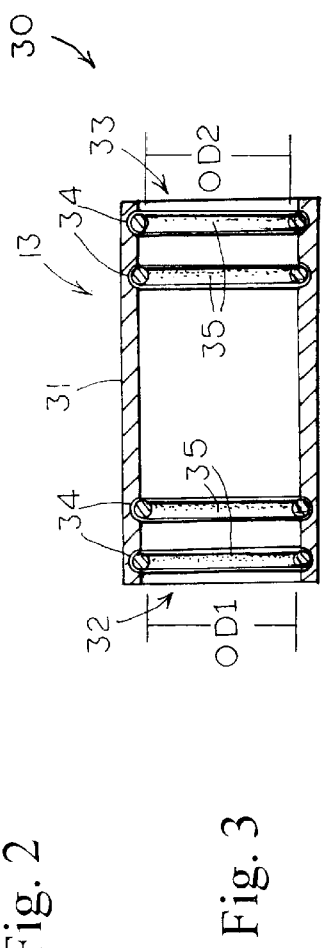
FIG. 3 is a side view, shown in partial cross-section, of a portion of an optical device in another preferred form of the invention.

With reference next to FIG. 3, there is shown a collar 30 in another preferred form of the invention. Here, the collar 30 has a rigid external, tubular shell 31 having a first end 32 and a second end 33. Each end 32 and 33 has two annular channels 34 in which are mounted resilient O-rings 35. The collar 30 operates similarly to the just described embodiment of FIGS. 1 and 2 except that the insertion of the scope eyepiece EP into the first end 32 and the insertion of the optical device lens unit 14 into the second end 33 causes the outward stretching of the elastic O-rings 35 rather than outward stretching of the entire ends 22 and 23 of the previous embodiment. Again, the O-rings provide an air tight seal to prevent the flow of moisture into the space between the scope and the optical device lens unit 14.

It thus is seen that an image intensifying device is now provided which enables the device to be coupled with another optical device in an easy and quick manner. While this invention has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. An image intensifying device adapted to be mounted to a scope having an objective lens and an eyepiece of a select outside diameter, said image intensifying device comprising,
    an image intensifying module;
    an eyepiece coupled to said image intensifying module, said eyepiece including an eyepiece lens; and
    an objective lens unit coupled to said image intensifying module opposite said image intensifying device eyepiece, said objective lens unit having an objective lens and a housing containing said objective lens, said housing having a tubular, elastic collar having a distal end with an inside diameter less than the outside diameter of the scope eyepiece,
    whereby the image intensifying device is mounted to the scope by stretching the elastic collar distal end about the scope eyepiece with the objective lens unit substantially aligned with the scope eyepiece.

2. The image intensifying device of claim 1 wherein said objective lens unit includes a focusing ring which is rotatable with respect to said image intensifying module for varying the distance between said image intensifying device objective lens and said eyepiece lens, and wherein said tubular, elastic collar is coupled to said rotatable focusing ring so that the focusing ring is rotatable relative to said image intensifying module with the image intensifying device mounted to the scope.

3. The image intensifying device of claim 2 wherein said elastic collar is removable from said focusing ring.

4. The image intensifying device of claim 3 wherein said collar provides an air tight seal about said focusing ring.

5. The image intensifying device of claim 1 wherein said elastic collar provides an air tight seal between the scope and said image intensifying device objective lens unit.

6. The image intensifying device of claim 1 wherein said collar distal end includes at least one resilient O-ring type seal.

7. A coupler for coupling an image intensifying device having an image intensifying module, an eyepiece and an objective lens unit of a selected diameter to a scope having an eyepiece of a selected outside diameter, said coupler comprising,
    a tubular collar having an elastic first end with an inside diameter less than the outside diameter of the scope eyepiece, and an elastic second end with an inside diameter less than the outside diameter of the image intensifying device objective lens unit,
    whereby the image intensifying device is mounted to the scope by stretching the elastic first end about the scope eyepiece and by stretching the elastic second end about the image intensifying module objective lens unit with the objective lens unit substantially aligned with the scope eyepiece.

8. The coupler of claim 7 wherein the image intensifying device objective lens unit includes a focusing ring and wherein the second end is adapted to be positioned upon and stretched about a focusing ring of the image intensifying module objective lens unit, whereby with the coupler mounted to the image intensifying module the focusing ring may still be rotated to provide focusing variances.

9. The coupler of claim 7 wherein said tubular collar has a rigid exterior shell having internal resilient members mounted within said shell forming said first and second elastic ends.

10. The coupler of claim 7 wherein said first and second ends provide an air tight seal with the scope and the image intensifying device.

* * * * *